Figure 1:
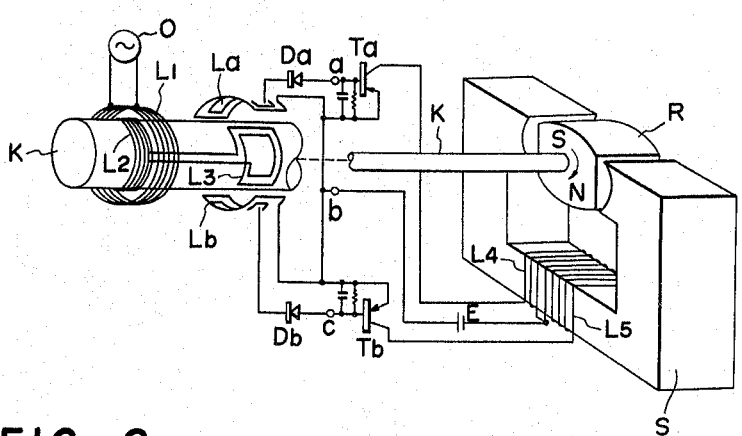

March 22, 1966  KAZUTOSHI IKEGAMI  3,242,405
BRUSHLESS ELECTRIC MOTOR

Filed April 23, 1963  2 Sheets-Sheet 1

3,242,405
BRUSHLESS ELECTRIC MOTOR
Kazutoshi Ikegami, Kitatama-gun, Tokyo-to, Japan, assignor to Kabushiki Kaisha Hitachi Seisakusho, Tokyo-to, Japan, a joint-stock company of Japan
Filed Apr. 23, 1963, Ser. No. 275,153
4 Claims. (Cl. 318—138)

This invention relates to a new brushless electric motor wherein the means for controlling the armature current in accordance with the rotation of the motor is formed by a so-called no-contact mechanism.

As is well known, a direct-current motor requires a means for controlling the armature current in accordance with the rotation of its rotor. In general, brushes are used as the said current control means. For this reason, such motors are accompanied by undesirable features such as generation of noise and troublesome maintenance. As a measure for eliminating such disadvantageous features due to brushes, brushless motors in which the function of the aforesaid brushes is accomplished by so-called no-contact switches have been proposed.

Among conventional brushless motors, there is a so-called transistor motor in which a control coil is disposed about a permanent magnet rotor, and the electromotive force generated in the control coil by the rotation of the said rotor is amplified by transistors, the output current of the said transistors being supplied to the armature coil of the stator. Since this type of transistor motor is not capable of self starting, it is not practical. As brushless motors capable of self starting, brushless motors wherein Hall generators are used in place of the aforesaid control coil have been disclosed. However, such motors have poor efficiency since the gain of Hall generators is low, and such motors have not been carried into practical use. The state of the prior art, as briefly indicated above, has been such that all known brushless motors have not yet reached a practical stage of development.

In view of this state of the prior art, it is the prime object of the present invention to provide a brushless motor of new type which differs fundamentally from conventional brushless motors, and in which the foregoing difficulties and other difficulties are overcome.

It is another object of the invention to provide a brushless motor as stated above which has a relatively simple construction.

The foregoing objects and other objects and advantages have been achieved by the present invention which, briefly described, provides a brushless motor provided with an armature current control system comprising an oscillator for generating a high-frequency signal in a continual manner irrespective of the rotor rotation, a detecting means for detecting this high-frequency signal which is fixed at a definite position, a transmission means for the said high frequency signal which is fixed at a definite position on the rotor shaft and is inductively coupled respectively with the output circuit of the aforesaid oscillator and the said detecting means, and a means for controlling the armature current in accordance with a control signal obtained from the said detecting means. The inductively coupling of the above-mentioned transmission means is effected by electromagnetic inductive coupling or electrostatic inductive coupling.

Figure 2:
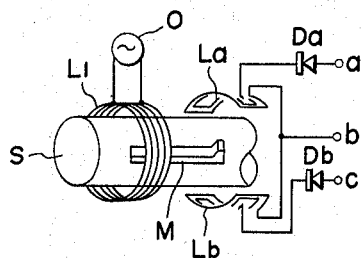
Figure 3:
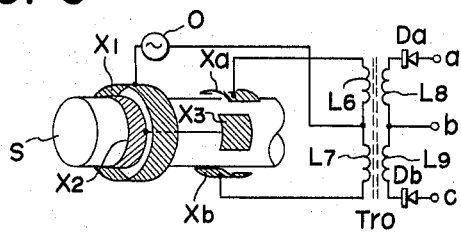
Figure 4:
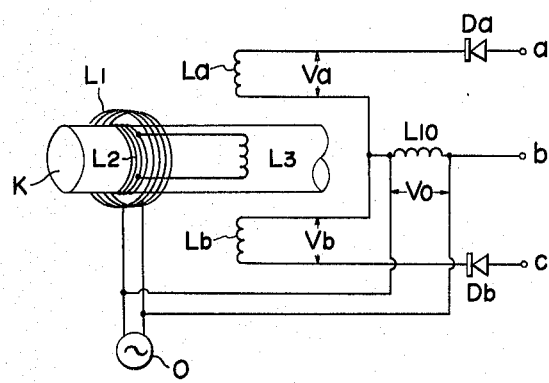
Figure 5:
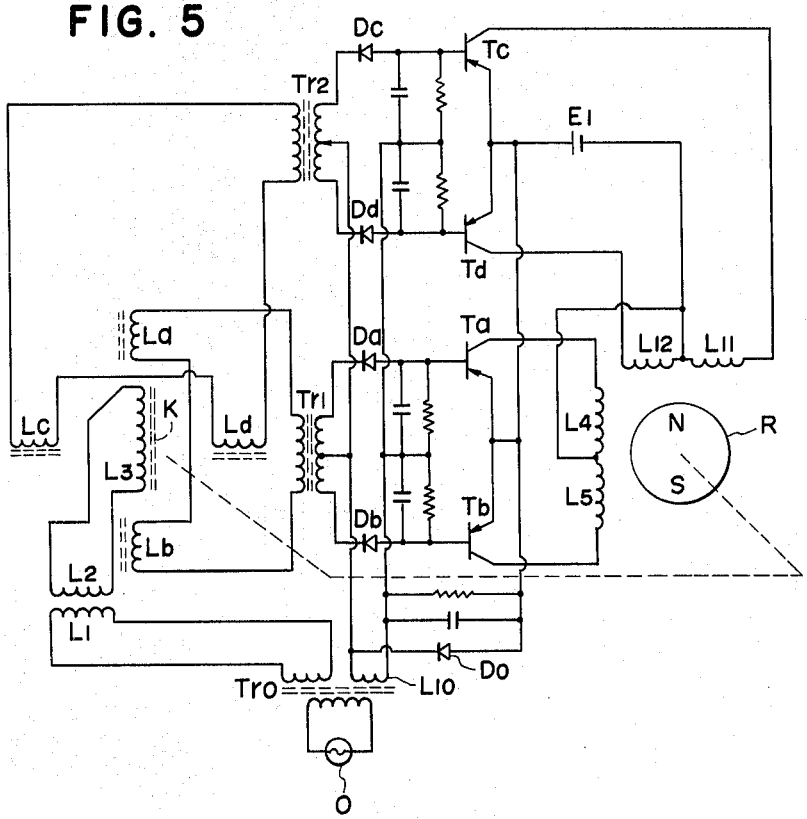

The precise nature, principle, and details of the invention will be more clearly apparent by reference to the following description of a few preferred embodiments of the invention, when read in conjunction with the accompanying drawing in which like parts are designated by like reference letters, and in which:

FIGURE 1 is a schematic diagram, partly in perspective view and partly as an electrical circuit diagram, indicating the compositional arrangement of one embodiment of the brushless motor according to the invention;

FIGURES 2, 3, and 4 are similar schematic diagrams showing other embodiments; and FIGURE 5 is a circuit diagram indicating still another embodiment of the invention.

Referring to FIGURE 1, a high-frequency oscillator 0 is connected to a fixed primary coil $L_1$ of the output circuit of the oscillator 0, the coil $L_1$ being disposed concentrically about the rotor shaft K of the motor and about, but not in contact with, a rotary secondary coil $L_2$ wound around the rotor shaft K. A rotary coil $L_3$ which is wound in a direction perpendicular to the winding direction of the coil $L_2$ is fixed at a definite position on the shaft K and is connected to the coil $L_2$. Pickup coils $L_a$ and $L_b$ for high-frequency signal are disposed at fixed positions, with equal spacing, concentrically about the coil $L_3$ so as to effect electromagnetic inductive coupling with the coil $L_3$ in accordance with the rotational angle of the rotor shaft K. The coils $L_2$ and $L_3$ rotate together with the rotor shaft K and constitute a transmission circuit for high-frequency signal. The fixed primary coil $L_1$ and the rotary secondary coil $L_2$ are constantly in a state of electromagnetic inductive coupling and form a transformer in which the secondary side rotates.

The circuit of the aforesaid pickup coils $L_a$ and $L_b$ includes diodes $D_a$ and $D_b$ for respectively rectifying the high-frequency signal generated in the said pickup coils, transistors $T_a$ and $T_b$ for respectively amplifying the rectified output signal of the diodes $D_a$ and $D_b$, armature coils $L_4$ and $L_5$ wound about the stator S of the motor and respectively connected at one terminal to the collectors of the transistors $T_a$ and $T_b$, and a direct-current power source E connected to the other, common terminals of the armature coils $L_4$ and $L_5$. A permanent magnet rotor R is disposed centrally between the poles of the stator S in the ordinary manner.

The brushless motor of the embodiment of the invention as described above has the following operation. The high-frequency signal generated by the oscillator 0 is supplied to the fixed primary coil $L_1$ and is transmitted by electromagnetic induction to the rotary secondary coil $L_2$. Consequently, a high-frequency current flows in the rotary coil $L_3$ connected to the said coil $L_2$. Then, if the position of the rotary coil $L_3$ is, for example, confronting the pickup coil $L_a$, and the coils $L_3$ and $L_a$ are in relative positions for mutually effecting electromagnetic inductive coupling, a high-frequency signal will be generated at the two ends of the pickup coil $L_a$. This signal is rectified by the diode $D_a$, whereby a direct-current signal for control is created between the terminals $a$ and $b$. This D.C. signal is amplified by the transistor $T_a$, whereby an exciting current flows in the armature coil $L_4$. Consequently, the stator S is magnetized and causes the rotor R to rotate, for example, in the direction of the arrow shown in FIGURE 1.

Then, when the rotary coil $L_3$ has rotated 180 degrees from the aforesaid position to confront the pickup coil $L_b$ and is in position of mutual electromagnetic inductive coupling with the coil $L_b$, a D.C. signal for control is created between the terminals $a$ and $b$ and is amplified by the transistor $T_b$, whereby an exciting current is caused to flow in the armature coil $L_5$. Consequently, the stator is magnetized in a direction reverse to that aforedescribed, whereby a torque tending to rotate the rotor R in the same direction as before is imparted to the rotor R. Thereafter, the foregoing operation is repeated. Accordingly, the rotor R is caused to rotate continuously as it is subjected to two cycles of rotational torque in the arrow direction during each revolution.

While, in the embodiment shown in FIGURE 1, rotary coils $L_2$ and $L_3$ are used as means for transmitting high-frequency signals, by inductive coupling, alternately to the pickup coils $L_a$ and $L_b$ in accordance with the rotational angle of the rotor R, the same operation can be accomplished also by fixing, for example, a high-frequency magnetic material M, at an appropriate position on the rotor shaft K as indicated in FIGURE 2 with the end of the said material M on the pickup coil side bent as indicated.

Furthermore, while the foregoing disclosure describes the case wherein high-frequency signals are detected by electromagnetic induction, it is also possible to detect such signals by electrostatic induction. FIGURE 3 illustrates one embodiment of the invention in the case wherein electrostatic inductive coupling is utilized. Conductors $x_1$, $x_2$, and $x_3$ are disposed at positions respectively corresponding those of the coils $L_1$, $L_2$, and $L_3$ shown in FIGURE 1. Pickup conductors $x_a$ and $x_b$ are disposed at positions respectively corresponding to those of the aforementioned pickup coils $L_a$ and $L_b$. The conductors $x_2$ and $x_3$ are electrically connected to each other and are fixed on the rotor shaft K. The pickup conductors $x_a$ and $x_b$ are respectively connected to one end of primary coils $L_6$ and $L_7$ of a transformer $T_{ro}$ for pickup which has secondary coils $L_8$ and $L_9$. An oscillator O is connected to the stationary conductor $x_1$ and to the junction between the primary coils $L_6$ and $L_7$, whereby a high-frequency signal generated by the oscillator O is impressed on the conductor $x_1$ and the said junction.

In the case of the above-described arrangement, the conductors $x_1$ and $x_2$ constantly constitute a capacitor. Furthermore, since pickup conductors $x_a$ and $x_b$ alternately form capacitors with the conductor $x_3$ at every 180 degrees of rotation of the rotor R, direct-current signals for control are created between the terminals $a$ and $b$ and between $b$ and $c$ with the rotation of the rotor R. If these D.C. signals are applied to transistors $T_a$ and $T_b$ similarly as in the case of the embodiment shown in FIGURE 1, the rotor R will undergo continuous rotation.

In a construction such as that indicated in FIGURE 1, when the rotary coil $L_3$ and the pickup coil $L_a$ are mutually confronting, a high-frequency signal, although of low magnitude, is induced also in the other pickup coil $L_b$. Since this signal imparts a torque tending to rotate the rotor R in the direction opposite to that of the arrow, there is the possibility of a lowering of the efficiency.

The above problem can be solved by an arrangement as indicated in FIGURE 4. That is, a rotary coil $L_3$ is so disposed and adapted as to undergo electromagnetic inductive coupling simultaneously with the pickup coils $L_a$ and $L_b$. In addition, a phase discrimination coil $L_{10}$ to which a high-frequency signal of constant phase is continually supplied from an oscillator O is provided and connected at one end thereof to the junction between the pickup coils $L_a$ and $L_b$ and at the other end thereof to the terminal $b$. By this arrangement, the circuit formed by the coils $L_3$, $L_a$, $L_b$, and $L_{10}$ and diodes $D_a$ and $D_b$ is a discriminator.

When a discriminator is used in this manner, the phases of the high-frequency signals $V_a$ and $V_b$ induced respectively in the pickup coils $L_a$ and $L_b$ vary by 180 degrees for each half revolution of the rotor R, but the phase of the high-frequency signal $V_o$ created in the phase discrimination coil $L_{10}$ is continually constant. Therefore, if the magnitudes of the respective signals of the above-stated three coils are caused to have the relation $$V_o = V_a = V_b$$

the signal $V_o$ will mutually cancel alternately with the signals $V_a$ and $V_b$, and, as a result, the pickup coils $L_a$, $L_b$ are alternately coupled in an independent manner to the coil $L_3$ at every 180 degrees of revolution of the rotor R. Accordingly, the afore-mentioned problem is eliminated, and the efficiency is increased.

It is to be noted that such a measure of using a discriminator can be applied also to the case of electrostatic inductive coupling as indicated in FIGURE 3 to obtain the same effect as described in the preceding paragraph.

While, in the foregoing disclosure, the case wherein the rotor R is subjected to a rotational torque twice during one revolution thereof and therby undergoes continuous rotation has been described, it is also possible to impart rotational torque to the rotor R four times during one revolution thereof. One embodiment of the invention as applied to this kind of torque control is shown in FIGURE 5. In this arrangement, pickup coils $L_c$ and $L_d$ are disposed about a rotary coil $L_3$ in positions separated by a spacing of 90 degrees relative to pickup coils $L_a$ and $L_b$. The circuit further has high-frequency transformers $T_{r0}$, $T_{r1}$, and $T_{r2}$, armature coils $L_{11}$ and $L_{12}$ wound about the stator (not shown in FIGURE 5) in positions separated by a spacing of 90 degrees relative to coils $L_4$ and $L_5$, and a diode $D_0$ to rectify a high-frequency signal generated in a discrimination coil $L_{10}$ to obtain a bias voltage with respect to transistors $T_a$, $T_b$, $T_c$, and $T_d$. By such a circuit arrangement, exiting current is caused to flow successively through the armature coils $L_4$, $L_{11}$, $L_5$ and $L_{12}$, in the order named, while the rotor rotates through one revolution, whereby rotational torque is imparted four times to the rotor R during the said one revolution thereof.

As described in the foregoing disclosure, the present invention provides a brushless motor in which the difficulties and disadvantages associated with ordinary motors and conventional brushless motors are overcome. In addition, the brushless motor according to the present invention has several other advantages. For example, since, in the said brushless motor, the rotational angle of the rotor is detected through the use of high-frequency signals, the detection circuit is simple, and normal rotational operation can be maintained even when the frequency of the said high-frequency signals fluctuate to a certain degree, wherefore the oscillator as described hereinbefore can be of simple construction. Moreover, this brushless motor is capable of self-starting. Accordingly, the brushless motor of the present invention has much higher practical value than conventional brushless motors.

In carrying the present invention into practice, various modifications and variations may be resorted to therein. As one example, both electromagnetic induction means and electrostatic means may be used together as the means for generating direct-current signals for control which are obtained in correspondence to the rotational angle of the rotor R in the above described embodiments. As another example, the number of poles may be increased, thereby to facilitate starting. As a further example, means other than transistors, for example, control rectifiers, may be used as amplification elements for amplifying the signals for control.

In view of the possibility of various modifications and variations as indicated above, it is to be understood that the present invention is not to be limited to the embodiments and details herein described, and that the full intended scope of the invention is defined in the appended claims.

What is claimed is:

1. A brushless electric motor equipped with a stator having windings, a rotor shaft, and a rotor thereon, comprising in combination, an oscillator which continuously generates a high-frequency signal irrespective of the rotation of the rotor; a fixed primary coil which is wound concentrically about the rotor shaft of the motor; a rotary secondary coil which is wound around said rotor shaft and is constantly in a state of electromagnetic inductive coupling with said fixed primary coil irrespective of the rotation of the rotor; means for supplying a high-frequency signal, generated in said rotary secondary coil, to a rotary coil which is fixed at an appropriate position on the rotor shaft; a plurality of pick-up coils which are disposed at certain fixed positions with equal spacing concentrically about the rotor shaft and selectively effect electromagnetic inductive coupling with the rotary coil in accordance with the rotation of said rotor; and means for amplifying the output of each pick-up coil whereby electric current flowing in the stator windings is controlled.

2. A brushless electric motor equipped with a stator having windings, a rotor shaft, and a rotor thereon, comprising in combination, an oscillator which continuously generates a high-frequency signal irrespective of rotation of the rotor; a fixed primary conductor plate which is disposed concentrically about the rotor shaft of the motor; a rotary secondary conductor plate which is disposed around said rotor shaft and is constantly in a state of electrostatic inductive coupling with said fixed primary conductor plate irrespective of the rotation of the rotor; means for supplying a high-frequency signal generated in said rotary secondary conductor plate to a rotary conductor plate which is fixed at an appropriate position on the rotor shaft; a plurality of pick-up conductor plates which are disposed at certain fixed positions with equal spacing concentrically about the rotor shaft and selectively effect electrostatic inductive coupling with the rotary conductor plate in accordance with the rotation of the said rotor; and means for amplifying the output of each pick-up conductor plate whereby electric current flowing in the stator winding is controlled.

3. A brushless electric motor equipped with a stator having windings, a rotor shaft, and a rotor thereon, comprising in combination, an oscillator which continuously generates a high-frequency signal irrespective of rotation of the rotor; a fixed primary coil which is wound concentrically about the rotor shaft of the motor; a rotary secondary coil which is wound around said rotor shaft and is constantly in a state of electromagnetic inductive coupling with said fixed primary coil irrespective of the rotation of the rotor; a plurality of pick-up coils which are disposed at certain fixed positions with equal spacing concentrically about the rotor shaft and selectively effect electromagnetic inductive coupling with the rotary coil in accordance with the rotation of the said rotor; means for introducing a high-frequency signal generated in said fixed primary coil wound concentrically about the rotor shaft of the motor to each of said plurality of pick-up coils through a high-frequency magnetic material fixed at an appropriate position on said rotor shaft; and means for amplifying the output of each pick-up coil whereby electric current flowing in the stator windings is controlled.

4. A brushless electric motor equipped with a stator having windings, a rotor shaft, and rotor thereon, comprising in combination, an oscillator which continuously generates a high-frequency signal irrespective of the rotation of the rotor; a fixed primary coil which is wound concentrically about the rotor shaft of the motor; a rotary secondary coil which is wound around said rotor shaft and is constantly in a state of electromagnetic inductive coupling with said fixed primary coil irrespective of the rotation of the rotor; a discriminator circuit which is constructed with a rotary coil fixed at an appropriate position on the rotor shaft, two sets of pick-up coils disposed at mutually opposite portions with equal spacing concentrically about the rotor shaft and electromagnetically coupled with said rotary coil at the same time, one end of each of said pick-up coils being connected to make a junction, and a phase discrimination coil connected at one end thereof to said junction between the two pick-up coils, a voltage of the said high-frequency oscillator being applied directly to said phase discrimination coil so that high-frequency outputs from each terminal of the said pick-up coils and phase discrimination coil may be applied to a stator winding.

References Cited by the Examiner
UNITED STATES PATENTS

| | | | |
|---|---|---|---|
| 2,980,839 | 4/1961 | Haeusserman | 318—138 |
| 3,091,728 | 5/1963 | Hogan | 318—138 |

ORIS L. RADER, *Primary Examiner.*

S. GORDON, *Assistant Examiner.*